(12) United States Patent
Garcia et al.

(10) Patent No.: US 12,233,346 B1
(45) Date of Patent: Feb. 25, 2025

(54) ELECTRONIC GAMING SUPPLEMENTATION METHOD AND SYSTEM

(71) Applicant: IllFonic Inc., Lakewood, CO (US)

(72) Inventors: Daniel Garcia, Lakewood, CO (US); Jared Gerritzen, Tacoma, WA (US)

(73) Assignee: IllFonic Inc., Lakewood, CO (US)

( * ) Notice: Subject to any disclaimer, the term of this patent is extended or adjusted under 35 U.S.C. 154(b) by 0 days.

(21) Appl. No.: 18/645,282

(22) Filed: Apr. 24, 2024

(51) Int. Cl.
*A63F 13/88* (2014.01)
*A63F 13/69* (2014.01)

(52) U.S. Cl.
CPC .............. *A63F 13/88* (2014.09); *A63F 13/69* (2014.09)

(58) Field of Classification Search
None
See application file for complete search history.

(56) References Cited

U.S. PATENT DOCUMENTS

| | | | | |
|---|---|---|---|---|
| 2005/0250574 | A1* | 11/2005 | Kane | G07F 17/32 463/17 |
| 2010/0279764 | A1* | 11/2010 | Allen | A63F 13/45 463/43 |
| 2014/0274371 | A1* | 9/2014 | Helava | A63F 13/69 463/31 |
| 2021/0027184 | A1* | 1/2021 | Heuser | G06N 20/00 |

* cited by examiner

*Primary Examiner* — Damon J Pierce
(74) *Attorney, Agent, or Firm* — Woods Rogers PLC; Timothy Bechen

(57) ABSTRACT

A computerized method and processing system provides for supplementing multiplayer video game gameplay. The method and system includes detecting a user disengaging from the multiplayer video game gameplay prior to a completion of a gameplay contest. The method and system further includes engaging the user in a mini-game computing event concurrent with the gameplay contest. If the user achieves a positive outcome in the mini-game computing event, the method and system presents the user with at least one gaming asset usable within the gameplay contest and updates the user account data relating to the gaming asset. Herein, the method and system continues to engage game players not active in the multiplayer contest via mini-games and allowed them to earn additional in-game rewards.

19 Claims, 7 Drawing Sheets

ELECTRONIC GAMING SUPPLEMENTATION METHOD AND SYSTEM

RELATED APPLICATIONS

There are no related applications.

FIELD OF INVENTION

The disclosed technology relates generally to electronic videogame and game processing systems and more specifically to generating supplemental or secondary gaming content relative to primary gaming content.

BACKGROUND

There are a large number of existing technologies for multi-player games, including managing data loads and user interfacing functions during gameplay. While existing technology focuses on data management and engagement for users, there are no solutions for the realities of downtime. When playing a multi-player game, players who lose or otherwise exit a match before the end of a match can experience varying amounts of downtime. Typically, these players are relegated to a spectator mode, where they have little or no impact on the outcome.

While players are connected to the gaming platform but in spectator mode, they are not actively engaged in gameplay. This is a problem for the player and the publisher of the multi-player game since both are penalized when players are not actively engaged. For players, these periods of downtime are boring and as a result they have a high likelihood of quitting the match in order to start a new match or quitting the game entirely for more engaging gameplay. Publishers lose revenue from this lack of engagement, such as missing out on in-game microtransactions.

A common existing gameplay solution includes allowing players who are out of the game to actively watch the on-going gameplay and communicate with teammates and/or other players. This allows players to observe, learn new tactics, and generally remain feeling involved in the gameplay.

Additionally, developers can penalize players in some form who quit before the end of the match by not rewarding the quitting player with points, unlocks, items, or other forms of in-game progression that may have been earned during the match. In one approach, developers can penalize quitters by placing them in a matchmaking pool together with other quitters. This is meant to counter the incentive of quitting, however it does not solve the problem of keeping players engaged during downtime in a multi-player game.

In addition to novel game systems and mechanics design, there are novel client and server challenges to implementing an engaging solution for players during downtime. These solutions are not obvious, as downtime in multi-player games has been around since the beginning of multi-player video games.

Therefore, there exists a need for a technical solution for supplementing multi-player gameplay engagements allowing for maintaining user engagement.

BRIEF DESCRIPTION

The present method and system keeps players engaged in multi-player games during downtime by providing the player with a mini-game, allowing them to earn in-game rewards. These rewards can be either for themselves if/when they are allowed back in, or to give to others on their team. The mini-games are used to shorten the time between gameplay engagements and the rewards received from playing these mini-games can be beneficial to teammates and overall match outcome. This incentivizes the spectating player to be more engaged with the multi-player gameplay when the user is not active in the multi-player game.

As disclosed herein, a computerized method and system provides for supplementing multiplayer video game gameplay. The computing system can be disposed local on a user gaming or computing device, distributed across a network connection, or a combination thereof, the computing system including one or more processing devices performing processing operations in response to executable instructions.

The method, as executed by the one or more computing devices includes detecting a user disengaging from the multiplayer video game gameplay prior to a completion of a gameplay contest. Herein, disengaging means the user is not active in the multi-player game, for example the user's character being killed in the game, the user terminating their engagement, user's being kicked out of a game by a connection glitch, or any other disengagement of gameplay. Moreover, a gameplay contest is any suitable type of multiplayer video game.

The method further includes, once the user is not within the multiplayer game, engaging the user in a mini-game computing event concurrent with the gameplay contest. The mini-game is any suitable type of side competition engaging the player, as recognized by a skilled artisan, where the mini-game computing event can be a game of chance, a game of skill, a game of logic, or any other suitable type of game.

If the user achieves a positive outcome in the mini-game computing event, the method includes presenting the user with at least one gaming asset usable within the gameplay contest. Herein, the positive outcome can be winning the mini-game computing event, achieving a score above a minimum amount, and/or not losing the mini-game competing event within a predetermined time period. Moreover, the at least one gaming asset includes a computerized item usable within the multiplayer video game to improve gameplay.

In one embodiment, when the user wins the mini-game, a graphical user interface is used to present a plurality of selectable reward images wherein the associated gaming asset is not visible. For example, a display may include 3 selectable cards, showing the back of the cards so the associated prize is not visible. Via the graphical user interface, the user selects of one of the plurality of reward images to reveal the prize of the gaming asset.

In a further embodiment, the user can be presented with the option of keeping the gaming asset or providing it to a teammate or other player active in the multiplayer game. In response to the user response, the method includes updating user account data to include the gaming asset. If the user keeps the asset, updating user account data includes updating user account data of the user and if the user gifts the at least one gaming asset updating the user data includes updating user account data of the second user.

In one embodiment, the mini-game display can be in a dual-display screen such that the user additionally receives video output of the gameplay contest.

The multiplayer video game gameplay may be any suitable type of gameplay. Examples include: all of the users against a computer, each of the users competing individually against each other, each of the users assigned to one of two or more teams and competing as evenly divided teams, and each of the users assigned to one of two or more teams and competing as unevenly divided teams.

Therefore, the present method and system offers mini-games as ancillary engagement options for users during multiplayer gameplay, offering users the ability to remain engaged, but also earn in-game assets to assist teammates still in the multiplayer arena.

A better understanding of the disclosed technology will be obtained from the following detailed description of the preferred embodiments taken in conjunction with the drawings and the attached claims.

DETAILED DESCRIPTION

The method and system herein provides for a computerized method and processing system for supplementing multi-player gameplay.

Figure 1:
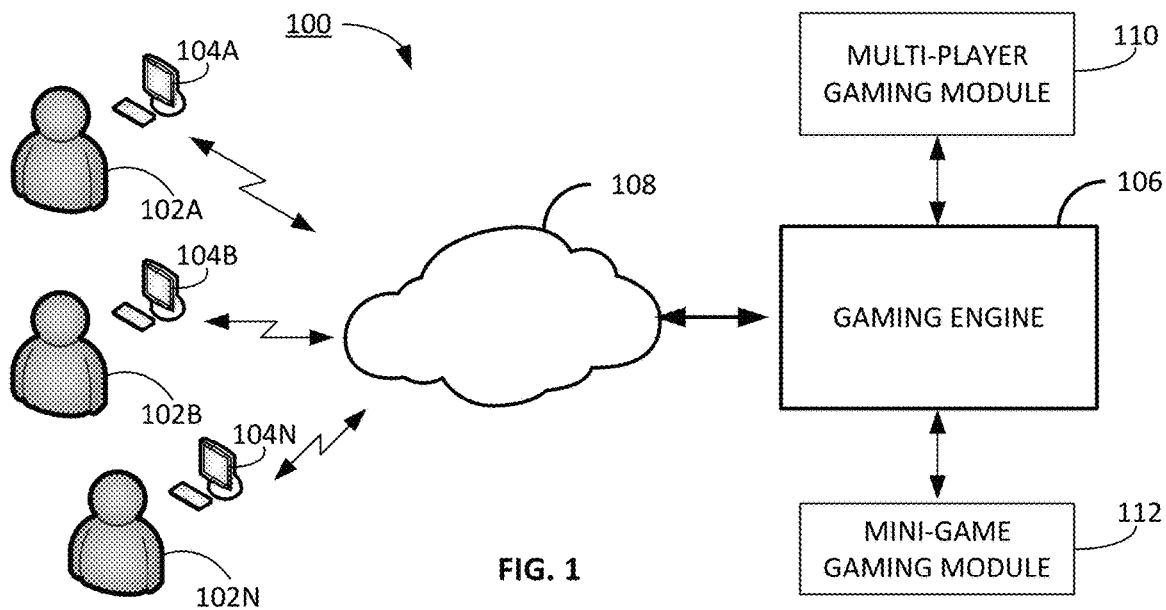
FIG. 1 illustrates one embodiment of a computing environment providing for multi-player and mini-game engagements.

FIG. 1 illustrates one embodiment of a system 100 having a plurality of users 102A-102N operating a computing systems 104A-104N for engaging in videogame gameplay via a game engine 106 across a network connection 108, where N can be any suitable integer. The game engine 106 includes at least two gaming modules, a multi-player gaming module 110 and a mini-game gaming module 112.

The users 102 can be one of any number of users engaging in multi-player gameplay via the game server 108. Typically the users 102 are geographically dispersed and engaged in multi-player gameplay via the engine 106. The users 102 can form teams and compete as teams.

The users 102 can also all cooperate together towards a common goal, competing against one or more computer-controlled players or elements. For example, in one embodiment described below, the users can all play different humans and the killer clowns are all computer controlled, creating the multi-player game of humans versus killer clowns.

The computing systems or devices 104 can be any suitable devices for engaging in videogame gameplay. For example, the device 104 can be a laptop computer, a desktop computer, a tablet computer, a smart phone, a gaming console, augmented reality/virtual reality headset and/or console, or any other suitable device for facilitating gameplay.

In one embodiment, the gameplay operations can be executed via local execution, for example running a local executable. For example, one embodiment may include running a local version of a videogame off an executable downloaded and executing at the local processing device 104. Execution operations can include network connectivity for multi-player functionality.

As used herein, computer readable medium may be any suitable non-transitory medium capable of having computer instructions stored thereon, said instructions transferrable and readable by one or more processing devices for performing processing operations therewith. The computer readable medium may be a single medium or a plurality of media disposed in a single or distributed environment.

In another embodiment, the gameplay operations can be executed via a networked, portal, or browser application with the gameplay operations being executed via server-based operations. For example, the computing device 104 may execute a portal application or a browser application on the local device and the gameplay executable is run in a cloud-based processing environment, with limited local software execution.

In another embodiment, the gameplay operations can be distributed across local processing and networking processing, including game control operations running off a locally-executed application but interactions and coordinating multi-player game being facilitated at the server or network side.

The network 108 can be one or more networks, as recognized by a skilled artisan. For example, in a typical embodiment the network 108 is the Internet. Whereas further embodiments may include additional network layers for connectivity. For example, a first network may be a wireless or wired connection to a router, the router engaged to the network 108. For example, a first network may be a cellular network accessible via a radio communication signal, the user connecting to the Internet via the cellular network. For example, a first network may be a virtual private network or other network for facilitating secure communication.

The gaming engine 106 can be any suitable network-based processing environment for hosting multi-player gaming engagement. The engine 106 can be a distributed computing system, for example a cloud-based system of multiple distributed computing systems distributing or sharing computation load. In another embodiment, the engine 106 can be a single or group of dedicated servers for performing gaming operations and supplementing operations as noted herein.

As illustrated in FIG. 1, the engine 106 includes two processing modules, a multi-player gaming module 110 and a mini-game gaming module 112. It is recognized by a skilled artisan, these modules may be disposed within the engine 106 or can be executed external or complimentary to the engine 106.

The multi-player gaming module 110 represents one or more executables for hosting and maintaining a multi-player videogame. Various operations of the module 110 can be consistent with known multi-player gaming operations, as recognized by a skilled artisan, for onboarding multi-players, engaging in numerous gaming events, and generally managing user interactions.

Multi-player gameplay can include any suitable type of multi-player environments. One embodiment includes all players on the same team in a common competition against computer-controlled enemies. One embodiment can include symmetrical teams in competition against one or more symmetrical teams. For example, one game may include a first team of 5 players in a contest against a second team of 5 players. For example, one game may include three or more teams, each having 5 players, competing against all other teams. For example, one game may include asymmetric teams in competition. For example, a first team may have 3 players competing against a second team having 7 players. One embodiment can include all players competing on an individual basis against all other players.

As described in greater detail below, the gaming module 110 includes additional functionality allowing for supplementing multi-player gameplay with interactions and events occurring via the mini-game gaming module 112.

The mini-game gaming module 112 includes software executables for offering users one or more mini-games. The module 112 can include interaction with the engine 106 for onboarding of players into the mini-games, as well as managing rewards and other benefits.

Figure 2:
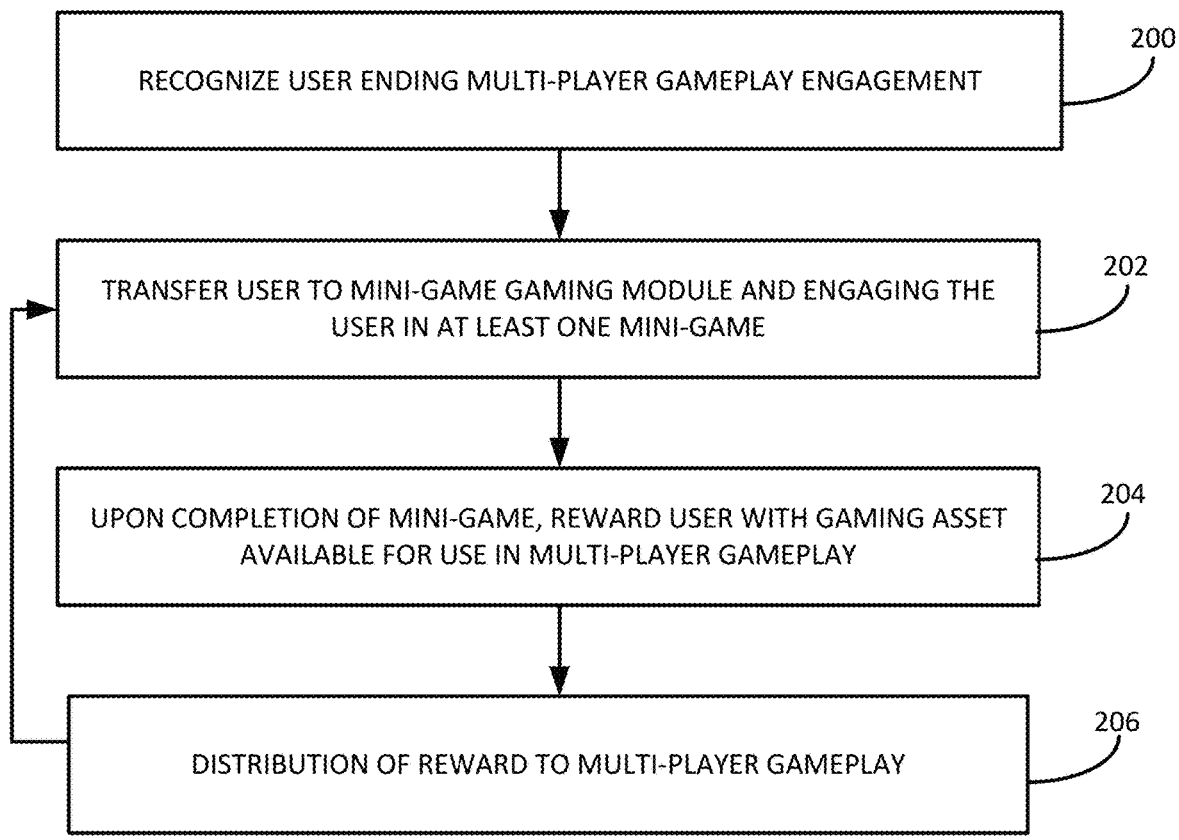
FIG. 2 illustrates a flowchart of the steps of one embodiment of a method for supplementing multi-player gameplay.

FIG. 2 illustrates a flowchart of methodology steps for supplementing multi-player gameplay. The method steps can be performed by the system 100 of FIG. 1 or any other suitable processing system or environment as recognized by a skilled artisan.

Step 200 is recognizing user ending multi-player gameplay engagement. This step may include processing operations to detect when a player has ended or otherwise disengaged from gameplay. For example, this could include the user's character being killed or otherwise eliminated in the multi-player game. For example, this can include a player aborting gameplay. For example, this can be where a user is glitched out of a game over a connection issue. Where prior solutions allowed for the user to become a spectator, the gaming engine 106 can therein detect the user's status and launch or otherwise redirect the user's platform engagement to a mini-game, step 202.

For example, one embodiment can include a pop-up screen or other display operation offering the user to play one or more mini-games while the multi-player gameplay continues. In one embodiment, mini-game engagement can be optional, allowing the user to decline a mini-game. For example, should a user decline a mini-game option, the engine 106 may track user engagements.

The mini-game gaming module (112 of FIG. 1) therein presents the user with at least one mini-game. As used herein, mini-game is a stand-alone and/or self-contained game, competition, sequence of events, or other user experience. The mini-game may be related to the multi-player game or can be a fully stand-alone and unrelated event. For example, the multi-player game can be a multi-team shooter game and the mini-game can be related, e.g. a shooting competition mini-game, or unrelated such as logic puzzles, game of chance, game of skill etc.

In one embodiment, the mini-game can be presented in a user interface screen concurrent with the multi-player gameplay. Here, the user can both spectate the gameplay and perform the minigame.

As part of the mini-game gaming module, users can be presented with rewards or other incentives. The rewards can be presented to the user prior to gameplay and/or rewards can be based on mini-game factors (e.g. speed of completion of game, efficiency, score, etc.) or other factors (e.g. multi-player game activities, other rewards available or remaining from other mini-games, user status relative to the gaming engine, etc.). For example, one embodiment can include a secondary user interaction upon mini-game completion for reward collection. One embodiment can include the user presented with multiple cards (e.g. 3 options) and the user selects one of the options. Upon selection, the user is presented with the selected option.

Step 204 is upon achieving a positive outcome in the mini-game, the user receives the reward, also referred to as a gaming asset. In one embodiment, this reward relates to or can be usable within the multi-player game. For example, the reward can be a health benefit usable in the game. For example, the reward can be a weapon or power benefit usable in the game. For example, the reward can be any suitable electronic asset or operation for improving or advancing gameplay.

Herein, the mini-game may be unrelated the multi-player game, but the reward can be related thereto. In another embodiment, the mini-game may have a consistent theme with the multi-player game, for example of the multi-player game is a contest against killer clowns, the mini-game can be a timed game of whacking clowns with a virtual mallet.

Step 206 is facilitating distribution of the reward to the multi-player gameplay. As noted in FIG. 1, the engine 106 operates between the modules 110 and 112, therefore where the reward is earned by the module 112, the engine 106 can include processing instructions for making the reward usable within the multi-player gaming module 110.

The reward can be presented to the user for the user to keep the reward. If the user selects to keep the reward, this game asset can be included in account data associated with the user. The reward can be gifted by the user to another user, for example gifted to a user currently active in gameplay. In one example, the user receiving the game asset can gift the asset to a teammate still active in gameplay. In this embodiment, the game asset is then added to the account data of the recipient user.

Figure 3:
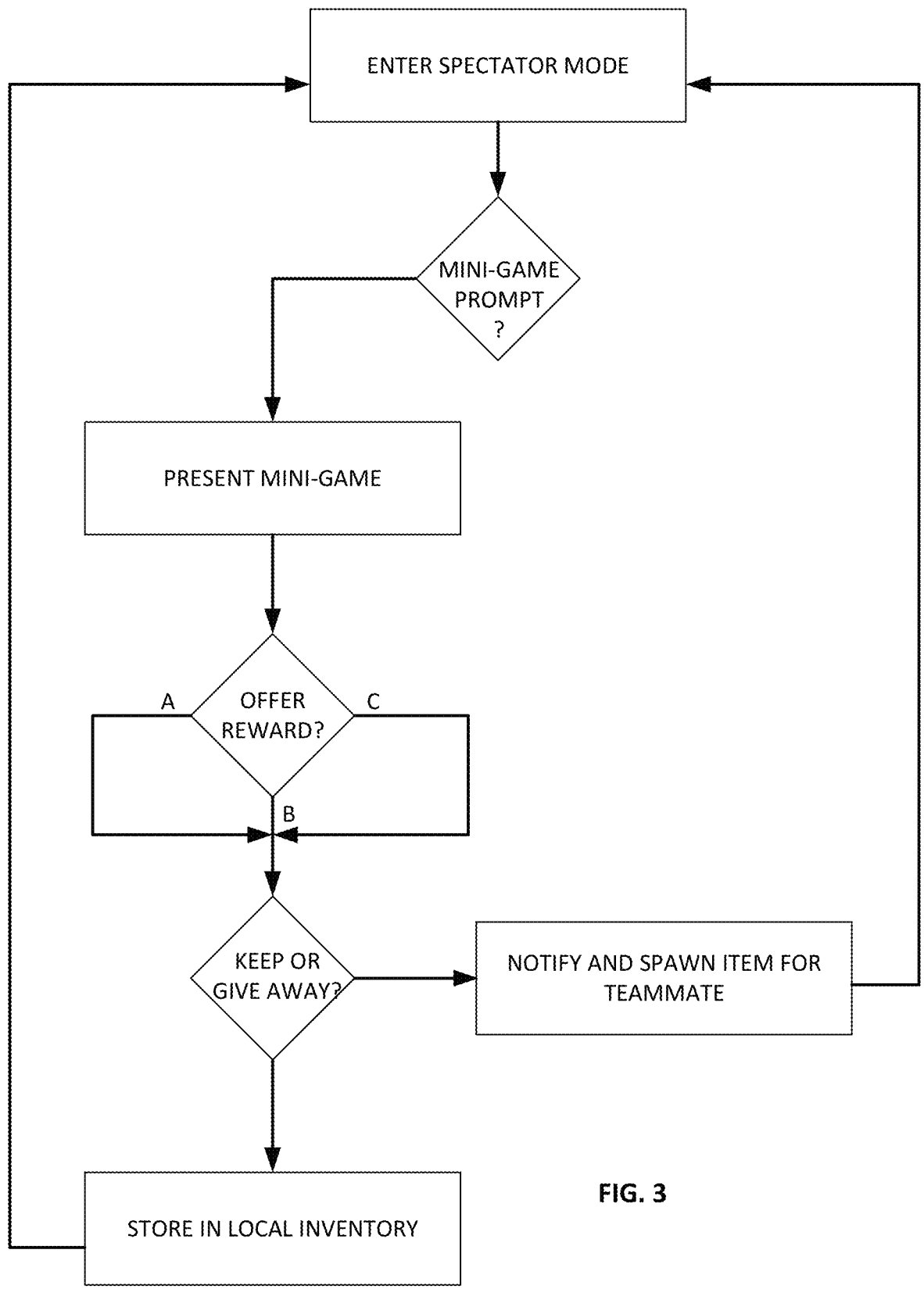
FIG. 3 illustrates a flow diagram.

FIG. 3 provides a sample embodiment of user interactions and processing system functions for the present method and system.

The user dies or otherwise exits from active competition in the multi-player game. For example, if the multi-player game is a team of players against the computer, the user may be defeated by the computer. The user then enters into spectator mode, no longer actively engaging in gameplay. In spectator mode, the user may be able to still watch gameplay and communicate with other players and/or teammates.

Figure 4:
FIGS. 4-12 illustrate sample screenshots.

FIG. 4 illustrates a sample screenshot of a multi-player game with multiple players, each player represents an in-game character being controlled by different users (e.g. users 102 of FIG. 1). In this game each user plays a human character, all users are on the same time, fighting a common enemy controlled by the computer.

Figure 5:

FIG. 5 illustrates a sample screenshot of the multi-player game including the computer-controlled character, in this embodiment being a killer clown. Where the users controls humans to fight against the killer clowns, there are gameplay scenarios where users characters are killed within the game. The user is then removed from the multi-player game and enters spectator mode. Under prior art solutions, the user would then simply watch the gameplay continue, risking user dis-engagement.

In the present method and system, while in spectator mode, the user is presented with a mini-game prompt. This prompt asks the user if he or she would like to engage in a mini-game either instead of or complimentary to being spectator mode. In one embodiment, the mini-game prompt may include other information such as possible reward(s) of the mini-game.

If the prompt is accepted, the user is presented with the mini-game. This came be within a pop-up window or other partial window display allowing for continuance of spectating the multi-player gameplay. In one embodiment, the mini-game can be a full window or fully immersive engagement, the user no longer actively aware of the multi-player gameplay. In another embodiment, winning the mini-game can include winning based on achieved a pre-set point level, winning a game or other contest, remaining active or alive in the mini-game for a period of time, or any other suitable engagement for the user to beat or at least not lose the mini-game.

Figure 6:

FIG. 6 illustrates a sample screenshot of a mini-game display. In this example, the mini-game is a game called "Repeat the Beat," where the user has to repeat a sequence of beeps by selecting corresponding keys. Also visible, the mini-game display is an overlay relative to spectating active gameplay. The on-going spectating within the mini-game can include routines for selecting what the user views, for example tracking teammates or other settings. In another embodiment, the on-going spectating can be controlled by the user, for example the user selecting to view a designed player still active in the multi-player gameplay. In another embodiment, the user can additionally change users to watch during the spectating mode, whereby spectating controls may be executed concurrent with mini-game operations.

FIG. 3 illustrates the embodiments of multiple reward options. The present method and system can utilize any number of available techniques for selecting the reward. The reward may be predetermined. The reward may be chosen from a set-up of available rewards based on additional factors or conditions, including but not limited factors or conditions of the multi-player gameplay. The reward may be limited to a type of reward based on the user's status or level within the gaming engine.

Figure 7:

The user completes the mini-game and is thus presented with a reward. In one example, FIG. 7 illustrates a sample screenshot of a successfully completed mini-game, e.g. in the FIG. 6 embodiment the user either repeats enough beats to win the game or stays active in the game without losing until a clock winds down. In this exemplary embodiment, the user is presented with three cards and the instruction to "choose a card." Also visible, the overlay of the mini-game display can include a display of a user's existing inventory as well as any other suitable game-related content or information.

Figure 8:
Figure 9:

FIG. 8 illustrates an exemplary screenshot where the user selected a card and the prize is revealed to include a Health Points in the form of a hamburger usable within the multi-player gameplay.

The user can then be presented with a gameplay decision upon acquiring the reward. The user can keep the reward, which if chosen, the reward is stored in a local inventory. The methodology reverts back the user being spectator mode, which may in some embodiments include additional mini-game(s).

The user can also choose to give away an item. The method can include notifying the gaming engine 110 and spawning the item for a teammate. The user can revert back to spectator mode.

For example, if the mini-game reward is a health booster, the user can choose to grant the reward to a teammate still active in the multi-player game. Here, the user, if eliminated earlier, can still contribute to teammates by completing mini-game activities for rewards and sharing the rewards back into the multi-player game. Similarly, for example of the user receives a health booster and all teammates are eliminated (or the user wishes to engage in selfish gameplay), the user can seek to keep the reward for his or her personal use in later rounds of multi-player gameplay.

Figure 10:
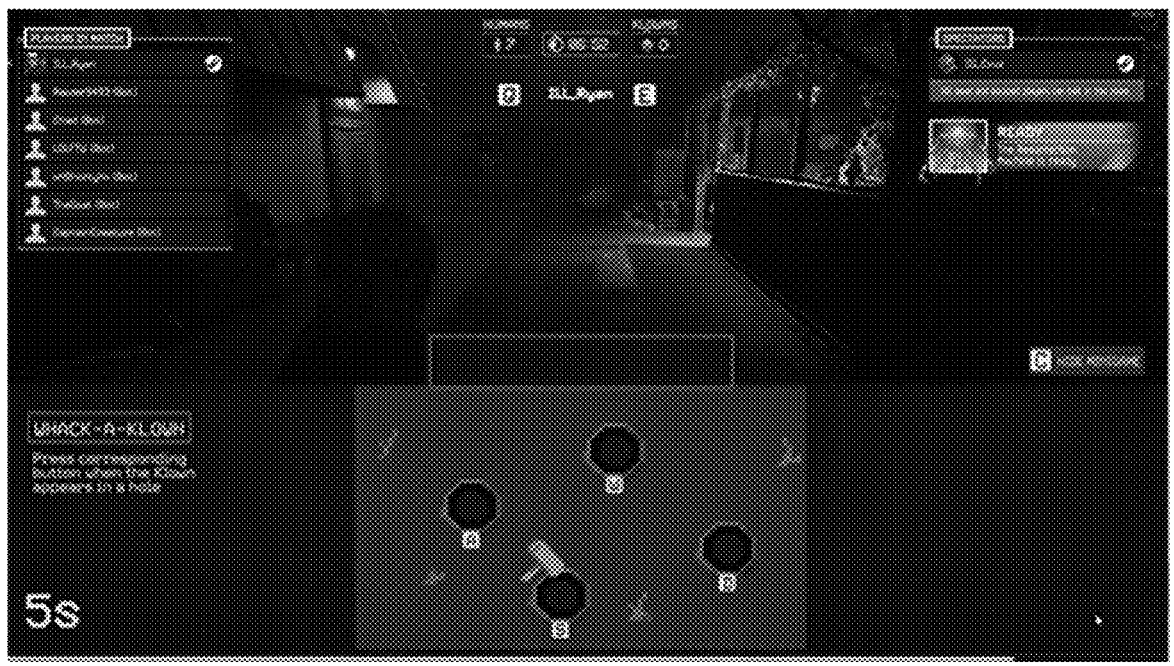
Figure 11:
Figure 12:

FIGS. 9-12 illustrate further examples, this embodiment being a mini-game entitled "Whack-A-Klown." The user controls a virtual mallet to whack clowns when they emerge from various holes. Here the user wins if they achieve a high enough score in a set time period. FIG. 10 illustrates gameplay and FIG. 11 illustrates winning and being offered to choose a card. FIG. 12 illustrates a prize awarded to the user available for donating to a teammate or keeping for oneself.

Therefore, the present method and system supplements multi-player gameplay by offering mini-game event(s) or other activities to users in spectator mode or more generally not actively engaged in the multi-player gameplay. The generation of rewards or other benefits can then be presented back into the multi-player gameplay, further incentivizing players to remain active and engaged in the game environment.

One embodiment includes the player (user) being in a "win" or "lose" state spectating the other players in the main game. While spectating the main game, they are prompted to play a mini-game. If selected, the mini-game is overlaid on top of the screen so that the player is still able to spectate the other players, while playing the mini-game. For example, the mini-game can be an 8-bit style 2D game that visually looks different from the main game, and is relatively simple (e.g. whack-a-mole game). Successfully completing the mini-game shortens the timer for a reward. Once the timer runs out, the player can choose one of three cards. The chosen card reveals an item that they can choose to keep for themselves if/when they are brought back into the main game OR they can gift the item to another player that they are spectating in the game. The intention is that the item that is kept or given to another player will provide an advantage to the player who has it in the main game.

Rewards can be determined relative to gameplay or dynamically accounted for or generated by the gaming engine 110 or another suitable engine. For example, let's say team A is eliminating a lot of team B players. This means that a lot more Team B players are playing mini-games and providing potentially useful items to Team B players, thus increasing their odds of success. One embodiment can include tracking team A versus team B users and changing the odds of receiving each item in the main game as well as the mini-game. In one embodiment, this tracking can be based on predetermined parameters and in another embodiment can be dynamically tracked and modified to avoid unfair advantages to multi-player gameplay from mini-game rewards.

FIGS. 1-12 herein are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

What is claimed is:

1. A computerized method for supplementing multiplayer video game gameplay, the method comprising:

engaging a plurality of computing devices, each of the plurality of computing devices controlled by one of a plurality of user, via a computing network, in the multiplayer video game gameplay controlled by a gaming engine, including generating for each of the plurality of users a screen display with interactive gameplay activity and distributing screen display outputs to each of the plurality of computing devices;

detecting, at the gaming engine, input commands from a first computing device of the plurality of computing devices, the input commands indicating a first user from the plurality of users disengaging from the multiplayer video game gameplay prior to a completion of a gameplay contest at the gaming engine;

while maintaining active gameplay of the gameplay contest for at least a portion of the plurality of computing devices for the plurality users, engaging the first computing device by the gaming engine such that the first user is engaged in a mini-game computing event concurrent with the gameplay contest by generating a second display screen providing a visual display of the mini-game computing event and receiving user interactions from the first computing device representing the first user for controlling actions within the mini-game computing event and wherein the mini-game computing event includes single player gameplay;

if the first user achieves a positive outcome in the mini-game computing event, the gaming engine generating an output display to the first computing device presenting the first user with at least one gaming asset usable within the gameplay contest; and updating user account data relating to the gaming asset.

2. The computerized method of claim 1 further comprising:

providing the mini-game computing event in a dual-display screen such that the first user additionally receives video output of the gameplay contest.

3. The computerized method of claim 1, wherein the mini-game computing event includes at least one of: a game of chance, a game of skill, and a game of logic.

4. The computerized method of claim 1, wherein the positive outcome includes at least one: winning the mini-game computing event, achieving a score above a minimum amount, and not losing the mini-game competing event within a predetermined time period.

5. The computerized method of claim 1, wherein the at least one gaming asset includes a computerized item usable within the multiplayer video game to improve gameplay.

6. The computerized method of claim 1, wherein the presenting the first user with the at least one gaming asset further comprises:

presenting, in a visual display, a plurality of selectable reward images wherein the associated gaming asset is not visible;

receiving a user selection of one of the plurality of reward images; and converting the selected reward image into a display of the least one gaming asset for the first user.

7. The computerized method of claim 1, further comprising:

inquiring the first user via a graphical user interface if the first user wants to keep the at least one gaming asset or if the first user wants to gift the at least one gaming asset to a second user wherein the second user is still active in the multiplayer gameplay;

such that if the first user keeps the at least one gaming asset updating user account data includes updating user account data of the first user and if the first user the at least one gaming asset updating the user data includes updating user account data of the second user.

8. The computerized method of claim 1, wherein the gameplay contest is at least one of: all of the plurality of users against a computer, each of the plurality of users competing individually against each other, each of the plurality of users assigned to one of two or more teams and competing as a team where the teams are evenly divided, and each of the plurality of users assigned to one of two or more teams and competing as a team where the teams are unevenly divided.

9. A computerized system for supplementing multiplayer video game gameplay, the system comprising:

a computer readable medium having executable instructions stored thereon; and a gaming engine disposed within a computer network, the gaming engine including at least one processing device, in response to the executable instructions, operative to:

engage a plurality of computing devices, each of the plurality devices controlled by one of a plurality of users, via the computer network, in the multiplayer video game gameplay, including generating for each of the plurality of users an output screen display with interactive gameplay activity and distributing screen display outputs to each of the plurality of computing devices;

detect input commands from a first computing device of the plurality of computing devices, the input commands indicating a first user from the plurality of users disengaging from the multiplayer video game gameplay prior to a completion of a gameplay contest;

while maintaining active gameplay of the gameplay contest for at least a portion of the plurality of computing devices for the plurality of users, engage the first user in a mini-game computing event concurrent with the gameplay contest by generating a second display screen output providing a visual display of the mini-game computing event and receiving user interactions from the first user for controlling actions within the mini-game computing event and wherein the mini-game computing event includes single player gameplay;

if the first user achieves a positive outcome in the mini-game computing event, generate an output display to the first computing device to present the first user with at least one gaming asset usable within the gameplay contest; and update user account data relating to the gaming asset.

10. The computerized system of claim 9, wherein at least one of the plurality of processing devices is disposed in a network-based processing environment, the system further comprising:

communicating with the first user via user input received via a local processing device and transmitted to the least one processing device across a network connection.

11. The computerized system of claim 9, wherein at least one of the plurality of processing devices includes a first processing device disposed local to the user and a second processing device disposed in a network processing environment, the system further comprising:

communicating with the first user via user input received via a local processing device and transmitted to the least one processing device across the computing network.

12. The computerized system of claim 9, wherein the positive outcome includes at least one: winning the mini-game computing event, achieving a score above a minimum amount, and not losing the mini-game competing event within a predetermined time period.

13. The computerized system of claim 9, wherein the presenting the first user with the at least one gaming asset further includes:
   presenting, in a visual display, a plurality of selectable reward images wherein the associated gaming asset is not visible;
   receiving a user selection of one of the plurality of reward images; and
   converting the selected reward image into a display of the least one gaming asset for the first user.

14. The computerized system of claim 9, the processing device further operative to:
   inquire the first user via a graphical user interface if the user wants to keep the at least one gaming asset or if the first user wants to gift the at least one gaming asset to a second user wherein the second user is still active in the gameplay contest;
   such that if the first user keeps the at least one gaming asset updating user account data includes updating user account data of the first user and if the first user gifts the at least one gaming asset updating the user data includes updating user account data of the second user.

15. The computerized system of claim 9, wherein the gameplay content is at least one of: all of the plurality of users against a computer, each of the plurality of users competing individually against each other, each of the plurality of users assigned to one of two or more teams and competing as a team where the teams are evenly divided, and each of the plurality of users assigned to one of two or more teams and competing as a team where the teams are unevenly divided.

16. A computerized method for supplementing multiplayer video game gameplay, the method comprising:
   hosting at a gaming engine disposed within a computing network, the multiplayer video game gameplay having a plurality of computing devices, each of the plurality of computing devices controlled by one of a plurality users engaged in a gameplay contest, including generating for each of the plurality of users a screen display with interactive gameplay activity;
   detecting, at the gaming engine, input commands from a first computing device of the plurality of computing devices, input commands indicating a first user of the plurality of users disengaging from the gameplay contest prior to a completion of the gameplay contest at the gaming engine;
   while maintain active gameplay of the gameplay content for at least a portion of the plurality of computing devices for the plurality of users, engaging the first computing device by the gaming engine such that the first user is engaged in a mini-game computing event concurrent with the gameplay contest by generating a second display screen providing a visual display of the mini-game computing event and receiving user interactions for controlling actions within the mini-game computing event, wherein the mini-game computing event includes single player gameplay;
   if the first user achieves a positive outcome in the mini-game computing event, the gaming engine generating an output display to the first computing device presenting the user with at least one gaming asset usable within the gameplay contest; and
   inquiring the first user via a graphical user interface if the first user wants to keep the at least one gaming asset or if the first user wants to gift the at least one gaming asset to a second user wherein the second user is still active in the gameplay contest;
   if the first user keeps the at least gaming asset, updating user account data of the first user; and
   if the first user gifts the at least one gaming asset to the second user, updating user account data of the second user.

17. The computerized method of claim 16, wherein the presenting the first user with the at least one gaming asset further comprising:
   presenting, in a visual display, a plurality of selectable reward images wherein the associated gaming asset is not visible;
   receiving a user selection of one of the plurality of reward images; and
   converting the selected reward image into a display of the least one gaming asset for the first user.

18. The computerized method of claim 16, wherein the mini-game computing event includes at least one of: a game of chance, a game of skill, and a game of logic and wherein the positive outcome includes at least one: winning the mini-game computing event, achieving a score above a minimum amount, and not losing the mini-game competing event within a predetermined time period.

19. The computerized method of claim 16, wherein the gameplay competition is at least one of: all of the plurality of users against a computer, each of the plurality of users competing individually against each other, each of the plurality of users assigned to one of two or more teams and competing as a team where the teams are evenly divided, and each of the plurality of users assigned to one of two or more teams and competing as a team where the teams are unevenly divided.

* * * * *